United States Patent [19]

Boardman

[11] Patent Number: 4,910,798
[45] Date of Patent: Mar. 20, 1990

[54] REVERSE NYQUIST SLOPE FILTER

[75] Inventor: Allen H. Boardman, Maryville, Tenn.

[73] Assignee: North American Philips Corp., New York, N.Y.

[21] Appl. No.: 194,766

[22] Filed: May 17, 1988

[51] Int. Cl.$^4$ ............................................. H04B 1/10
[52] U.S. Cl. .................................... 455/295; 455/209; 358/197
[58] Field of Search ................ 455/208, 209, 314–316, 455/266, 265, 260, 340, 295, 302–306, 338; 333/165; 358/155, 157, 167, 197

[56] References Cited

U.S. PATENT DOCUMENTS

| | | | |
|---|---|---|---|
| 4,211,979 | 7/1980 | Muraoka et al. | 455/306 |
| 4,370,741 | 1/1983 | Haass | 455/295 |
| 4,476,536 | 10/1984 | Jones, Jr. | 364/607 |
| 4,580,289 | 4/1986 | Enderby | 455/314 |
| 4,602,287 | 7/1986 | Fockens | 358/197 |

Primary Examiner—Benedict V. Safourek
Assistant Examiner—Curtis Kuntz
Attorney, Agent, or Firm—Marianne R. Rich

[57] ABSTRACT

A circuit for providing a mirrored version of a preselected transfer function includes a circuit having the preselected transfer function coupled to receive a signal modulated by a signal that is to experience the mirrored transfer function. The modulated signal at the output terminal of this circuit is mixed with a signal at a frequency that is greater than the carrier frequency of the modulated signal. The signal resulting from this mixing operation then is low pass filtered to provide the desired mirrored response.

14 Claims, 1 Drawing Sheet

REVERSE NYQUIST SLOPE FILTER

BACKGROUND OF THE INVENTION

1. Field of the Invention

The invention pertains to the field of information transmission, and more particularly, to the transmission of information, without distortion, over a frequency band centered on a skirt of the transmission system passband.

2. Description of the Prior Art

Since the inception of color TV, the industry has continually strived to improve the picture quality. Though many significant advances have been realized, there is an unending clamor for still more. Presently, the demand exists for increasing the screen size from an aspect ratio of 4:3 to an aspect ratio of 5⅓:3, thereby providing an additional 33% of information area. To accomplish this, and maintain compatibility with existing equipment, the additional information required for the increase aspect ratio screen must be transmitted and received in a manner that prevents picture distortion due to crosstalk between the additional information signals and the standard information signals. Complicating the problem is the FCC prescribed 6 MHz bandwidth per channel. This bandwidth restriction requires the additional information to share a frequency allocation with the standard information.

One method utilized for providing the required isolation without exceeding the 6 MHz requirement applies the additional information to a doubly-balanced modulator, which utilizes the same carrier frequency utilized for transmitting the standard information signals. A phase shift of 90° is inserted in the additional information carrier relative to the phase of the standard information carrier. In this manner, two quadrature related signals, with the additional signal being of the double sidebandsuppressed carrier type, are provided at the output terminals of the modulators which may be simultanenously transmitted within the same signal channel. These signals may be separated and detected at the receiver in two signals channels by means of synchronous demodulators without one corrupting the other. The degree of isolation between the two channels is dependent upon the deviation from the quadrature relationship between the two modulator signals. Any variation of phase and amplitude symmetry between the sidebands of each channel affects the phase for that channel and as a consequence the quadrature relationship between the channels. Deviation from the quadrature relationship reduces the isolation between the channels, thereby permitting crosstalk.

The addition of the double sideband suppressed-carrier quadrature channel to increase the information handling capacity in the TV channel, adapts well to conventional television transmission equipment. Further, the quadrature relationship, if properly maintained, reduces the sensitivity of standard receivers to the additional channel information.

Receivers presently in use employ Nyquist slope filters in conjunction with a picture signal demodulator to establish a flat response for the picture signals. In this system, the carrier signal is positioned at the −6dB point of the Nyquist slope filter, thus centering the quadrature channel at the −6dB point on the Nyquist slope of the receivers IF filter. To prevent distortion of the signals in the quadrature channel at detection, the signals in this channel must be distorted upon transmission in a manner that counteracts the Nyquist slope frequency response. In the prior art, this was accomplished by passing the additional information signals through a filter having a ramp frequency response with a slope that is the mirror image of the Nyquist slope filter with the signal frequencies centered about the −6dB point of one slope of the Nyquist filter. This procedure requires that the frequency response of the two mirror image slopes be very closely match, a condition very difficult to achieve.

SUMMARY OF THE INVENTION

In accordance with the principles of the present invention, two information transmission channels are provided, one being inphase and the other being in quadrature with the carrier signal generated at the transmitter. A reverse Nyquist slope filter is provided in the quadrature channel by applying the quadrature carrier signal and the information bearing signal to a doubly-balanced modulator. The double sideband suppressed carrier quadrature channel signal provided by the modulator is coupled through a bandpass filter, having the same amplitude/phase versus frequency response as the IF bandpass filter of the receiver, to a doubly-balanced mixer having a local oscillator that is the second harmonic of the suppressed carrier of the quadrature channel. Only sum and difference signals are coupled to the output port of the doubly balanced mixer. These signals are coupled through a lowpass filter wherefrom the difference frequencies, resulting from mixing the second harmonic of the quadrature channel carrier signal frequency with the double sideband suppressed carrier signal from the bandpass filter, are selected. This difference frequency is the mirror image of the signals at the output terminals of the bandpass filter. Thus, an amplitude and phase response versus frequency transfer function which is the mirror image of the receiver IF bandpass response along the frequency axis is generated. When the quandrature channel signal is received and passed through the IF bandpass filter of the receiver, a symmetrical amplitude and phase response about the carrier signal frequency is realized. This causes the sidebands at the output of the mixer in the quadrature channel to be symmetrical about the suppressed carrier, thereby maintaining the quadrature relationship with demodulated signals in the in-phase channel.

DESCRIPTION OF THE PREFERRED EMBODIMENT

Figure 1:
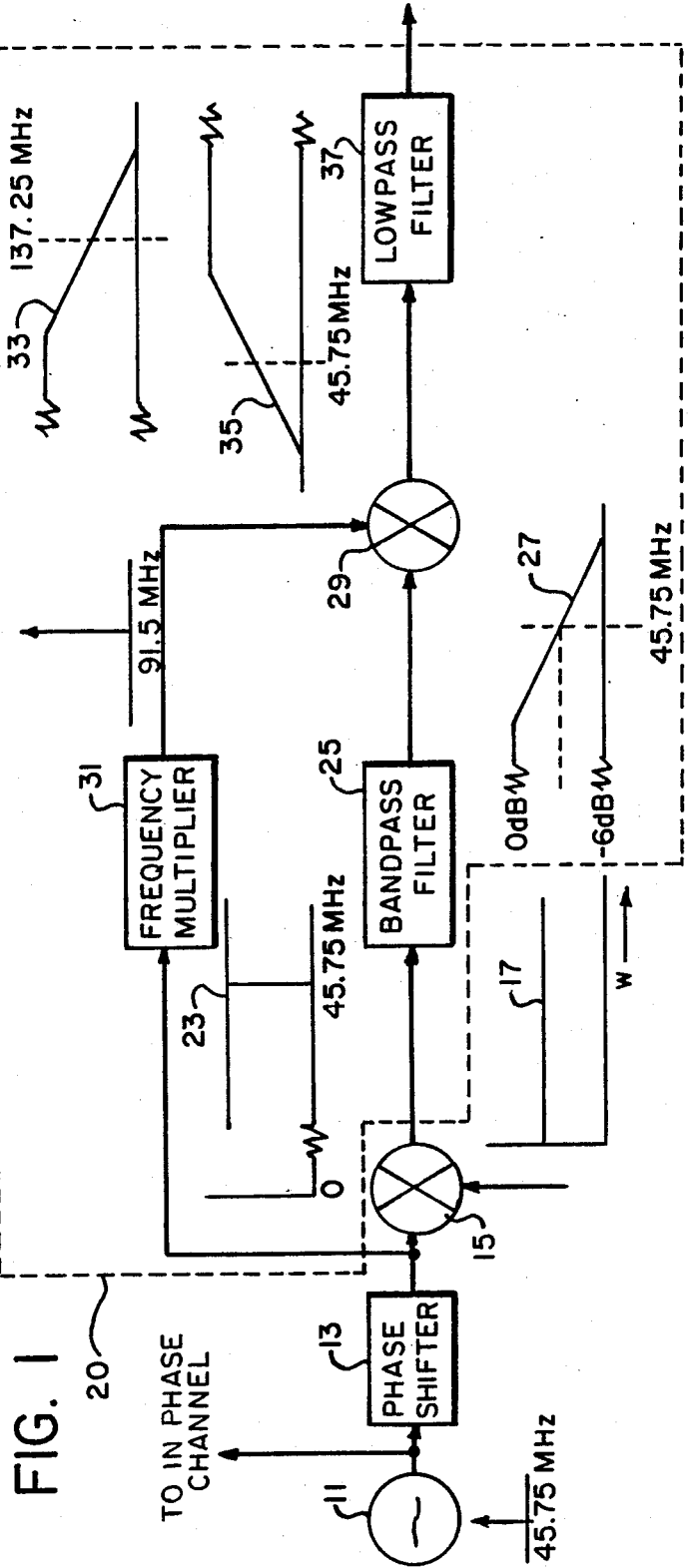
FIG. 1 is a block diagram of a preferred embodiment of the invention.

Referring to the FIG. 1, a carrier oscillator 11, which for purposes of explanation may provide a signal at a frequency of 45.75 MHz, is coupled to a modulator, not shown, to provide a modulated carrier that is in-phase with the carrier signal provided by the oscillator 11. This carrier signal may also be passed through a 90° phase shifter 13 to establish a carrier signal in quadrature with the carrier signal provided by the oscillator 11. This phase shifted carrier is coupled to a doubly-balanced modulator 15 wherein it is modulated by a baseband signal. The modulated quadrature carrier is coupled to a filter circuit 20, yet to be described, having a reverse Nyquist transfer function.

To explain the operation of the circuitry, consider a baseband signal 17 of uniform amplitude coupled to the modulator 15. Since a doubly-balanced modulator provides a double sideband suppressed carrier output signal, the modulation of the quadrature carrier from the phase shifter 13 by the baseband signal 21 in the doubly-balanced modulator 15 provides a signal 23 to the filter 20 centered at 45.75 MHz. The response of the filter 20 to the signal 23 is representative of the transfer function of the filter 20.

The signal 23 provided by the modulator 15 is coupled to a bandpass filter 25, in the filter 20, having an amplitude/phase versus frequency response that is identical to that of the bandpass IF filter utilized in the corresponding receiver, having a Nyquist slope with the −6dB point at 45.75 MHz. In response to the signal 23, the output signal 27 from the filter 25 exhibits a ramp amplitude function representative of the Nyquist slope of the filter 25. This signal, with an amplitude ramp function of frequency 27, is coupled to a doubly-balanced mixer 29 having a local oscillator at a frequency of 91.5 MHz that is derived from the quadrature carrier at the output of the phase shifter 13 by a frequency doubling in a frequency multiplier 31. It is well known that the doubly-balanced mixer provides sum and difference signals centered about the frequency of a suppressed local oscillator signal. Consequently, the output of the doubly-balanced mixer 29 is the sum signal 33 and the difference signal 35. Passing these signals through a lowpass filter 37 eliminates the sum signal 35. Examination of the difference signal 35 reveals an increasing ramp with the center frequency of 45.75 MHz at the −6dB point. Thus, an amplitude and phase response versus frequency transfer function which is the mirror image of the bandpass filter 25 has been established as the transfer function for the filter circuit 20.

Figure 2:
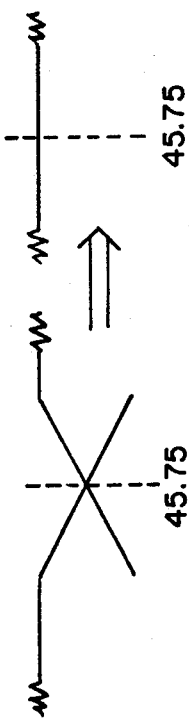
FIG. 2 is an illustration of the addition of a transfer function to its mirror image to provide a symmetrical amplitude and phase response about the carrier signal frequency.

For the example given, the carrier oscillator provided by the phase shifter 13 is in quadrature with the carrier signal frequency provided to the in-phase channel. Consequently, signals at the output terminal of the lowpass filter 37 may be combined with the signals at the output terminals of the in-phase channel with substantially no crosstalk between these channels. At the receiver, the in-phase and quadrature signals may be separated and separately detected using coherent detection. The difference signal in the quadrature channel provided by the mixer therein may be coupled to an IF bandpass filter which is substantially identical to the bandpass filter 25 to provide a flat amplitude and linear phase overall system response about the center frequency, which for the example given, is 45.75 MHz, as illustrated in FIG. 2. The sidebands established in the quadrature channel will be symmetrical about the suppressed carrier eliminating any distortion in the inphase channel demodulator due to signals in the quadrature channel.

In the example given above, the local oscillator frequency in the inverse filter 20 was selected to be twice the carrier frequency. This choice establishes a transfer function for the filter 20 that is the mirror image of the transfer function for the filter 25, both transfer functions having the same center frequency. It should be recognized that a mirror image of the transfer function for the filter 25 could be obtained at a center frequency other than that of the filter 25 by providing a multiplicative factor for the frequency multiplier 31 which differs from 2.

While the invention has been described in its preferred embodiment, it is to be understood that the words which have been used are words of description rather than limitation and that changes may be made within the purview of the appended claims without departing from the true scope and spirit of the invention in its broader aspects. Though the invention has been described with respect to the transmission of two quadrature related signals, it is not limited to this embodiment and is generally applicable wherever the mirror image of a filter function is desired.

I claim:

1. An apparatus for providing a transfer function that is inverse to a preselected transfer function comprising:
   means for providing a carrier signal at a predetermined frequency;
   means for providing an input signal;
   means coupled to said carrier signal means and said input signal means for modulating said carrier signal by said input signal to provide a modulated signal;
   circuit means having said preselected transfer function coupled to receive said modulated signal for providing a first signal in accordance with said modulated signal and said preselected transfer function;
   frequency means for providing a second signal having a second frequency integrally related to which said predetermined frequency; and combining means coupled to said circuit means and said frequency means for combining said first and second signals to provide an output signal such that said output signal to said input signal ratio defines a transfer function that is inverse to said preselected transfer function.

2. An apparatus in accordance with claim 1 wherein said combining means comprises:
   means having an output terminal coupled to said circuit means and said frequency means for mixing said first and second signals in a manner to provide a signal at said output terminal having frequencies formed from differences between frequencies of said first and second signals; and
   filter means coupled to said output terminal for suppressing signals at frequencies above said formed frequencies to provide said signal in accordance with said input signal and said inverse transfer function.

3. An apparatus in accordance with claim 1 wherein said second signal is a frequency that is twice said predetermined frequency, so that said output signal is at a frequency equal to said predetermined frequency.

4. An apparatus in accordance with claim 2 wherein said frequency means is coupled to receive said carrier signal and includes means for multiplying said predetermined frequency by a preselected factor to provide said second signal at a frequency greater than said predetermined frequency.

5. An apparatus in accordance with claim 4 wherein said preselected factor is two, so that said output frequency is at a frequency equal to said predetermined frequency.

6. A method for providing a transfer function that is inverse to a preselected transfer function comprising the steps of:

providing a carrier signal at a predetermined frequency;

providing an input signal;

modulated said carrier signal by said input signal to provide a modulated signal;

coupling said modulated signal to a circuit having said preselected transfer function to provide a first signal in accordance with said preselected transfer function and said modulated signal;

coupling said carrier signal to a frequency circuit that is responsive to said carrier signal for providing a second signal at a frequency corresponding to said predetermined frequency; and combining said first and second signal to provide an output signal such that said output signal to said input signal ratio defines a transfer function that is inverse to said preselected transfer function.

7. A method in accordance with claim 6 wherein said combining step includes the steps of:

mixing said first and second signals in a manner to provide a signal having frequencies formed from differences between frequencies of said first and second signals; and filtering said signal provided by said mixing step to suppress signals above said formed frequencies to provide said signal in accordance with said input signal and said inverse transfer function.

8. A method in accordance with claim 6 wherein said frequency of said second signal is equal to twice said predetermined frequency, so that said output signal is at a frequency equal to said predetermined frequency.

9. A method in accordance with claim 6 wherein said step of providing a second signal includes the steps of receiving said carrier signal and multiplying said predetermined frequency by a factor to provide said second signal at a frequency greater than said predetermined frequency.

10. The method of claim 9 wherein said factor in said multiplying step is two, so that said output signal is at a frequency equal to said predetermined frequency.

11. An apparatus for providing a transfer function that is inverse to a preselected transfer function comprising:

means for providing a carrier signal at a predetermined frequency;

means for providing an input signal;

means coupled to said carrier signal means and said input signal means for modulating said carrier signal by said input signal to provide a modulated signal;

circuit means having said preselected transfer function coupled to receive said modulated signal for providing a first signal in accordance with said modulated signal and said preselected transfer function;

frequency means coupled to said carrier signal means for providing a second signal having a second frequency corresponding to said predetermined frequency; and combining means coupled to said circuit means and said frequency means for combining said first and second signals to provide an output signal such that said output signal to said input signal ratio defines a transfer function that is inverse to said preselected transfer function.

12. An apparatus in accordance with claim 11, wherein said second frequency is a multiple of said predetermined frequency.

13. An apparatus in accordance with claim 11 wherein said combining means comprises:

means having an output terminal coupled to said circuit means and said frequency means for mixing said first and second signals in a manner to provide a signal at said output terminal having frequencies formed from differences between frequencies of said first and second signals; and filter means coupled to said output terminal for suppressing signals at frequencies above said formed frequencies to provide said signal in accordance with said input signal and said inverse transfer function.

14. An apparatus in accordance with claim 1 wherein said second signal is a frequency that is twice said predetermined frequency, so that said output signal is at a frequency equal to said predetermined frequency.

* * * * *